F. ZAISS.
Machines for Making Match-Sticks.
No. 5,548. Reissued August 19, 1873.
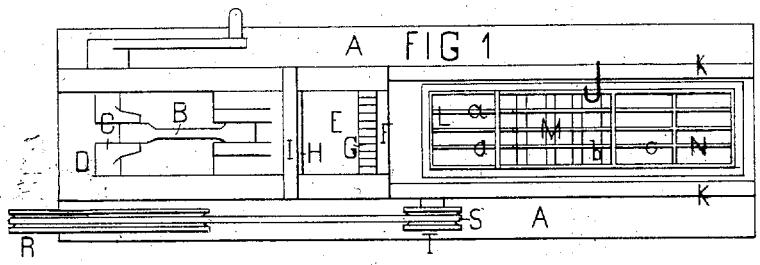
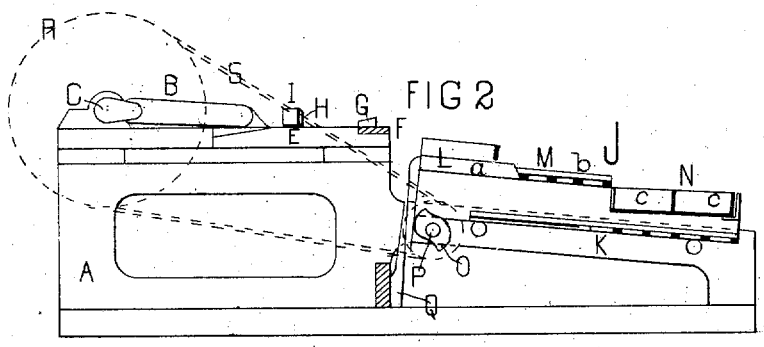
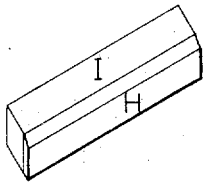
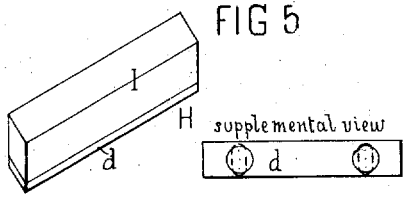
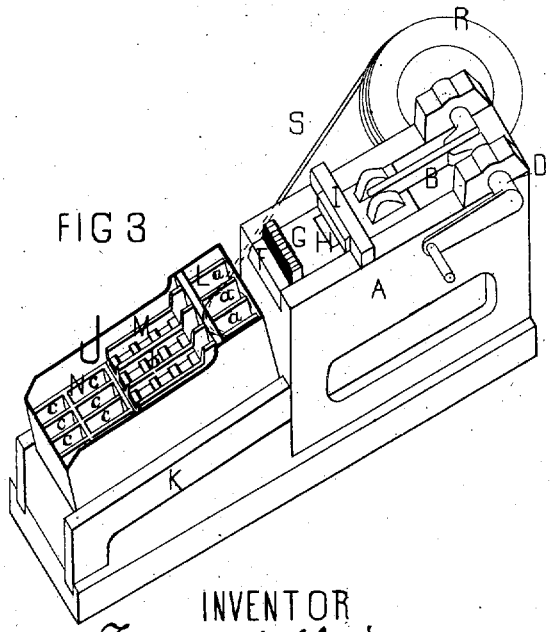
WITNESSES
Edmund P. Cochran.
A. T. Walter
INVENTOR
Frederick Zaiss
by Francis D. Pastorius
his Atty in fact

UNITED STATES PATENT OFFICE.

FREDERICK ZAISS, OF PHILADELPHIA, PENNSYLVANIA.

IMPROVEMENT IN MACHINES FOR MAKING MATCH-STICKS.

Specification forming part of Letters Patent No. 136,893, dated March 18, 1873; reissue No. 5,548, dated August 19, 1873; application filed May 15, 1873.

*To all whom it may concern:*

Be it known that I, FREDERICK ZAISS, of the city and county of Philadelphia and State of Pennsylvania, have invented an Improved Match-Stick Machine, of which the following is a specification:

The improved machine is intended for using not only prepared blocks, but also refuse lumber, ends, &c., in the manufacture of match-sticks.

Figure 1 is a plan view. Fig. 2 is a longitudinal section. Fig. 3 is an isometrical perspective view. Figs. 4, 5 are views of the butting-block. Figs. 1, 2 are drawn to the same scale. Figs. 3, 4, 5 are drawn to different scales.

A is the frame of the machine, which should be strongly and durably made to resist the vibrations incident to the working parts. B is a rod, which connects the crank C of the shaft D with the cutter-head E of the machine. F is a plate, which is secured to the head E. It has a transverse row, G, of match-stick cutters attached to it. H is a metallic butting block or plate on the transverse bar I. J is a winnower on the ways K attached to the frame A. It is composed of the straightener L, the riddle or cleaner M, and the collector N. A cam, O, of the shaft P presses the winnower against a spring, Q, when motion is communicated from the driving-pulley R, hung on the shaft D, by the belt S to the pulley T hung on the shaft P. The reciprocating action of the cam and the spring gives to the winnower a peculiar jerking movement.

The blocks to be made into match-sticks are introduced between the cutters G and the butting block or strip H. The forward motion of the cutters severs as many match-sticks as there are cutting-points presented, which remain in the cutters until they are pushed out by the succeeding cut. The match-sticks, after formation, drop into the straightening-box L of the winnower J, which is divided into longitudinal troughs by the ribs *a*, for straightening and placing the sticks parallel. The jerking motion of the winnower causes them to move endwise onto the riddle or cleaner M, which is also divided into troughs by the ribs *b*, which form continuations of the ribs *a*. The riddle has a sieve or lattice bottom, through which all the shavings and dirt are dropped. From the riddle or cleaner the match-sticks pass to the collector N and drop into the boxes *c* composing the same, from which they are taken by the attendant.

The indentations formed by the cutters in the edge of the metal butting-plate H are removed by filing or otherwise, after which the plate is adjusted and set up to the cutters, so that they will strike it without damaging their cutting-edges.

I claim as my invention—

1. The transverse plate or butting-block H and its cross-bar I, in combination with the match-stick cutters G, substantially for the purpose shown and described.

2. The winnower J, in connection with a match-stick machine, for the purpose shown and described.

In testimony whereof I hereunto sign my name in presence of two subscribing witnesses.

FREDERICK ZAISS.

Witnesses:

BERNHARD FELDMANN,
FRANCIS D. PASTORIUS.